(12) United States Patent
Bin Ahmad et al.

(10) Patent No.: US 7,926,756 B2
(45) Date of Patent: Apr. 19, 2011

(54) SPINNING REEL DRAG KNOB

(75) Inventors: Abu Supian Bin Ahmad, Johor (MY); Md Shahid Bin Sowarni, Johor (MY)

(73) Assignee: Shimano Components (Malaysia) SDN. BHD., Pontian, Johor (MY)

( * ) Notice: Subject to any disclaimer, the term of this patent is extended or adjusted under 35 U.S.C. 154(b) by 0 days.

(21) Appl. No.: 12/760,979

(22) Filed: Apr. 15, 2010

(65) Prior Publication Data

US 2010/0301149 A1  Dec. 2, 2010

(30) Foreign Application Priority Data

Jun. 2, 2009 (JP) ................................. 2009-133051

(51) Int. Cl.
*A01K 89/01* (2006.01)
(52) U.S. Cl. ........................................ 242/319; 242/246
(58) Field of Classification Search .................. 242/246, 242/303, 319
See application file for complete search history.

(56) References Cited

U.S. PATENT DOCUMENTS

2003/0146320 A1   8/2003  Yamaguchi

FOREIGN PATENT DOCUMENTS

| JP | 3-91776 U | 9/1991 |
|---|---|---|
| JP | 2004-135542 A | 5/2004 |
| JP | 2005-137240 A | 6/2005 |
| JP | 2006-136216 A | 6/2006 |

OTHER PUBLICATIONS

The extended European Search Report of corresponding European Application No. 10164328.6 dated Sep. 23, 2010.

*Primary Examiner* — Emmanuel M Marcelo
(74) *Attorney, Agent, or Firm* — Global IP Counselors, LLP

(57) ABSTRACT

A spinning reel drag knob screwed onto a distal end of a spool shaft has a knob member, a nut member and a sealing member. The knob member presses a drag washer of a drag mechanism, and includes a circular rimmed portion and a cylindrical outer periphery. The rimmed portion has a knob portion on a front surface of the rimmed portion to regulate drag force. The outer periphery is formed on a back side of the rimmed portion. The nut member is disposed in the knob member and is unitarily rotatable with the knob member. The sealing member includes an attachment portion, a first sealing portion, and a second sealing portion. The attachment portion is attached to the outer periphery. The first sealing portion contacts an inner peripheral surface of the spool, and the second sealing portion makes contact with a radial outward part of the back side.

6 Claims, 5 Drawing Sheets

SPINNING REEL DRAG KNOB

CROSS-REFERENCE TO RELATED APPLICATIONS

This application claims priority to Japanese Patent Application No. 2009-133051 filed on Jun. 2, 2009, the entirety of which is hereby incorporated by reference.

BACKGROUND

1. Field of the Invention

The present invention relates to a spinning reel drag knob, particularly to a spinning reel drag knob that is screwed onto the front end of a spool shaft where a spool is attached to regulate drag force of a drag mechanism.

2. Background Information

In front-drag spinning reels, a spool normally contains drag washers of a drag mechanism. The drag force of the drag washers are regulated by a drag knob screwed onto a spool shaft. Generally, a well-known drag knob includes a knob body and a press member. The knob body is a rimmed member having a knob portion on the front side thereof. The knob body contains at least a part of the press member. The knob body has a cylindrical outer periphery formed on the back side of the rim. Some drag knobs of this type have been widely known to have a sealing member that is attached to the outer peripheral surface of the knob body (or the press member) to prevent liquid from entering the housing part that contains the drag washers. For example, drag knobs of this type are described in Laid-open Japan Patent Application Publication Nos. JP-A-2004-135542 and JP-A-2006-136216. In the drag knob described in the former publication, the sealing member is attached to the outer peripheral surface of the press member. The sealing member seals a clearance between the press member and the inner periphery of the spool. The sealing member simultaneously seals the rear end surface of the press member. In the drag knob described in the latter publication, on the other hand, the seal member seals a clearance between the outer peripheral surface of the knob body and the inner peripheral surface of the spool. Thus, liquid is blocked from entering the inner housing part of the spool that contains the drag mechanism with the foregoing structures because the sealing member is attached between the drag knob and the inner peripheral surface of the spool.

In the well-known drag knobs having the foregoing structures, a large space is produced between the back side of the rim and the front side of the sealing member. Due to this structure, liquid may be caught in the space in some occasions such as when fishing is done on a rainy day or the spinning reel is soaked and washed in liquid. If liquid is actually caught in the space, the liquid may further flow into the inner housing part of the spool that contains the drag mechanism when the drag knob is detached from the spinning reel. Specifically, when the distal end of the sealing member is detached from the inner peripheral surface of the spool, liquid caught in the space may further flow into the inner housing part of the spool that contains the drag mechanism.

In view of the above, it will be apparent to those skilled in the art from this disclosure that there exists a need for an improved spinning reel drag knob that prevents liquid from entering the housing part that contains the drag mechanism and simultaneously prevents liquid from being caught in the space between the sealing member and the rim of the drag knob. This invention addresses this need in the art as well as other needs, which will become apparent to those skilled in the art from this disclosure.

SUMMARY

A spinning reel drag knob according to a first aspect is screwed onto a distal end of a spool shaft where a spool configured to move back and forth in a spinning reel is attached. The spinning reel drag knob is configured to regulate drag force of a drag mechanism contained in the spool. The spinning reel drag knob includes a knob member, a nut member, and a sealing member. The knob member is configured to press a drag washer of the drag mechanism. The knob member includes a circular rimmed portion and a cylindrical outer periphery. The rimmed portion has a knob portion that protrudes from the front surface thereof. The knob portion serves to regulate the drag force. The outer periphery has small diameter, and is formed on a back side of the rimmed portion. The nut member is disposed in the knob member while being unitarily rotatable with the knob member. The nut member is also screwed onto the distal end of the spool shaft. The sealing member includes an attachment portion, a first sealing portion, and a second sealing portion. The attachment portion is attached to the outer periphery. The first sealing portion makes contact with the inner peripheral surface of the spool. The second sealing portion makes contact with a radial outward part of the back side of the rimmed portion.

When the spinning reel drag knob is firmly screwed onto the spool shaft, the first sealing portion of the sealing member makes contact with the inner peripheral surface of the spool. This structure can prevent liquid from entering the inner part of the spool where the drag mechanism is contained. Further, the second sealing portion makes contact with the radial outer part of the back side of the rimmed portion. This structure can reduce the amount of liquid to be caught in the space between the sealing member and the rimmed portion as much as possible. Overall, when the sealing member is attached to the outer peripheral surface of the knob member, the first sealing portion makes contact with the inner peripheral surface of the spool whereas the second sealing portion makes contact with the radial outer part of the back side of the rimmed portion. This structure reduces the space between the sealing member and the rimmed portion. Accordingly, it is possible to reduce the amount of liquid that can be caught in the space between the sealing member and the rimmed portion as much as possible. Therefore, liquid can be prevented from entering the housing part that contains the drag mechanism, and simultaneously liquid cannot be easily caught in the space between the sealing member and the rimmed portion.

A spinning reel drag knob according to a second aspect relates to the spinning reel drag knob according to the first aspect, wherein in the spinning reel drag knob, the first sealing portion has an outer diameter greater than that of the rimmed portion.

According to the spinning reel drag knob of the second aspect, the first sealing portion has an outer diameter greater than that of the rimmed portion. Here, space is produced between the first sealing portion and the second sealing portion that makes contact with the radial outer part of the back side. However, almost all of the space between the first sealing portion and the second sealing portion is opened to the outside because of the foregoing configuration. Therefore, it is possible to reduce the amount of liquid to be caught in the space as much as possible.

A spinning reel drag knob according to a third aspect relates to the spinning reel drag knob according to one of the first and second aspects, wherein in the spinning reel drag knob, the sealing member further includes a third sealing portion that makes contact with the outer periphery.

According to the spinning reel drag knob of the third aspect, the third sealing portion is disposed to make contact with the outer peripheral surface of the knob member. Therefore, liquid cannot easily enter the housing part containing the drag mechanism from the inner peripheral side of the sealing member, even when the liquid enters the back side of the rimmed portion without being blocked by the second sealing portion.

A spinning reel drag knob according to a fourth aspect relates to the spinning reel drag knob according to the third aspect, wherein in the spinning reel drag knob, the back side of the rimmed portion is formed in a flat shape, and the attachment portion of the sealing member is disposed along the back side while being formed on the radial inner side of the second sealing portion.

According to the spinning reel drag knob of the fourth aspect, the attachment portion is disposed along the back side while being formed on the radial inner side of the second sealing portion. The structure can eliminate almost all of the space between the back surface and the attachment portion. Therefore, it is possible to reduce the amount of liquid that enters the back side of the rimmed portion without being blocked by the second sealing portion. Further, liquid cannot easily enter the housing part containing the drag mechanism from the inner peripheral side of the sealing member.

A spinning reel drag knob according to a fifth aspect relates to the spinning reel drag knob according to one of the first to fourth aspects, wherein in the spinning reel drag knob, the knob member includes a knob body, a press member, a retainer member, and an urging member. The knob body has the rimmed portion, the outer periphery, and a housing recess. The housing recess is formed in the interior of the knob body. The housing recess has a rear end surface opened to the outside. The press member is formed in a cylindrical member configured to press the drag washer. The press member is partially contained in the housing recess. The press member is coupled to the spool shaft while being prevented from rotating and allowed to move axially. The retainer member holds the press member to prevent the press member from being detached from the housing recess. The urging member is disposed between the nut member and the press member. The nut member is disposed in the housing recess while being allowed to move back and forth and to rotate unitarily with the housing recess.

According to the spinning reel drag knob of the fifth aspect, the knob member is composed of the knob body, the press member, the retainer member, and the urging member. Here, the knob body is configured to rotate the nut by rotating with respect to the spool shaft, and the press member is prevented from rotating with respect to the spool shaft. Further, the press member, which makes contact with the drag washer, is pressed by the nut member through the urging member. Therefore, drag force can be minutely adjusted by way of the urging member. In addition, the drag washer, which makes contact with the press member, is prevented from rotating with respect to the spool shaft. Therefore, the press member and the drag washer are prevented from relatively rotating. Consequently, the press member can smoothly press the drag washer.

A spinning reel drag knob according to a sixth aspect relates to the spinning reel drag knob according to one of the first to fifth aspects, wherein in the spinning reel drag knob, the knob member includes an annular groove. The annular groove is formed on the outer periphery, and is arranged in the vicinity of the back side of the rimmed portion. Further, the sealing member is an elastic member configured to be attached to the annular groove.

According to the spinning reel drag knob of the sixth aspect, the sealing member is an elastic member. Therefore, the sealing member can be attached to the annular groove without a retainer member or the like. Further, the annular groove is arranged in the vicinity of the rimmed portion. Therefore, the sealing member can be disposed in the vicinity of the rimmed portion, and the back side of the rimmed portion can be reliably sealed.

According to the spinning reel drag knob disclosed herein, when the sealing member is attached to the outer peripheral surface of the knob member, the first sealing portion makes contact with the inner peripheral surface of the spool whereas the second sealing portion makes contact with the radial outer part of the back side of the rimmed portion. This structure reduces the space between the sealing member and the rimmed portion. It is thereby possible to reduce the amount of liquid to be caught in the space between the sealing member and the rimmed portion as much as possible. Consequently, liquid can be prevented from entering the housing part that contains the drag mechanism, and simultaneously liquid cannot be easily caught in the space between the sealing member and the rimmed portion.

These and other objects, features, aspects, and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Entire Structure and Reel Body Structure

Figure 1:
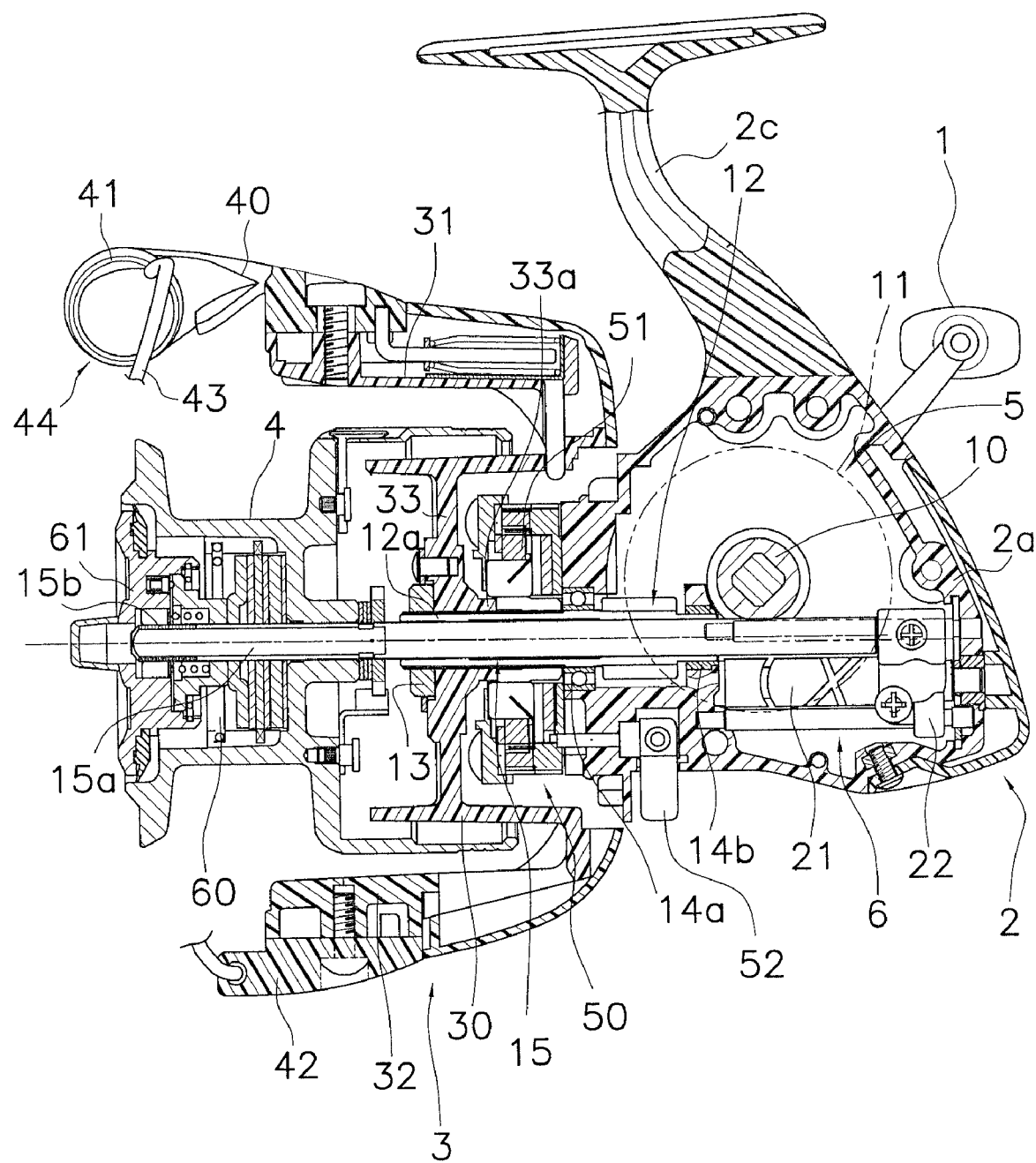
FIG. 1 is a cross-sectional side view of a spinning reel according to an exemplary embodiment.

As illustrated in FIG. 1, a spinning reel, according to an exemplary embodiment, includes a reel unit 2, a rotor 3, and a spool 4. The reel unit 2 supports a handle 1 while allowing the handle 1 to rotate. The rotor 3 winds a fishing line onto the outer periphery of the spool 4. The rotor 3 is supported at the front of the reel unit 2 in a rotatable state. The spool 4 winds the fishing line onto its outer periphery. The spool 4 is disposed on the front of the rotor 3 while being movable back and forth. Note the handle 1 can be attached to either the left side or the right side of the reel unit 2.

The reel unit 2 includes a reel body 2a, a lid member (not illustrated in the figure), and a rod attachment leg 2c. The reel body 2a has an opening. The lid member is detachably attached to the reel body 2a to cover the opening. The rod attachment leg 2c extends from the lid member in an obliquely upward direction. The reel body 2a includes a hollow space in its interior. The hollow space contains a rotor drive mechanism 5 and an oscillation mechanism 6. The rotor drive mechanism 5 is configured to rotate the rotor 3 in conjunction with rotation of the handle 1. The oscillation mechanism 6 is configured to wind uniformly the fishing line by moving the spool 4 back and forth.

The rotor drive mechanism 5 includes a main gear 11 and a pinion gear 12. The main gear 11 rotates together with a main gear shaft 10 where the handle 1 is secured. The pinion gear 12 meshes with the main gear 11. The pinion gear 12 is a tubular gear passing through the center of the rotor 3. The pinion gear 12 has a front part 12a fixed to the rotor 3 by a nut 13. In addition, the pinion gear 12 has an intermediate part supported in a rotatable state by the reel unit 2 through a bearing 14a. The pinion gear 12 further has a rear part supported in a rotatable state by the reel unit 2 through a bearing 14b.

The oscillation mechanism 6 is configured to move a spool shaft 15 back and forth. The spool shaft 15 is herein coupled to a drag mechanism 60 while passing through the center of the spool 4. Therefore, the spool 4 is configured to move back and forth together with the drag mechanism 60. The oscillation mechanism 6 includes a spiral shaft 21 and a slider 22. The spiral shaft 21 is disposed below and in parallel to the spool shaft 15. The slider 22 is configured to move back and forth along the spiral shaft 21. The slider 22 is secured to the rear end of the spool shaft 15 in a non-rotatable state. The spiral shaft 21 is configured to revolve in conjunction with the rotation of the handle 1.

Rotor Structure

The rotor 3 includes a cylindrical part 30, a first rotor arm 31, and a second rotor arm 32. The first rotor arm 31 and the second rotor arm 32 are opposed to each other and disposed lateral to the cylindrical part 30. The cylindrical part 30, the first rotor arm 31, and the second rotor arm 32 are integrally formed.

The cylindrical part 30 has a front wall 33 in its front part. The front wall 33 has a boss 33a in its center part, and the boss 33a has a through hole in its center part. The front part 12a of the pinion gear 12 and the spool shaft 15 pass through the through hole. Further, the nut 13 is disposed in or on front of the front wall 33. The rotor 3 is fixed to the front part 12a of the pinion gear 12 by the nut 13.

The first rotor arm 31 extends from the cylindrical part 30 while being curved outward in a convex shape. A first bail support member 40 is attached to the outer peripheral side of the distal end of the first rotor arm 31 in a pivotable state. A line roller 41 is attached to the distal end of the first bail support member 40 for guiding the fishing line to the spool 4. The second rotor arm 32 extends forward from the cylindrical part 30 while being curved outward in a convex shape. A second bail support member 42 is attached to the outer peripheral side of the distal end of the second rotor arm 32 in a pivotable state. A bail 43 is fixed to both the line roller 41 and the second bail support member 42. The bail 43 is formed by curving a wire rod in a roughly U-shape. The first bail support member 40, the second bail support member 42, the line roller 41, and the bail 43 form a bail arm 44. The bail arm 44 can pivot between a fishing-line guide posture illustrated in FIG. 1 and a fishing-line release posture inverted from the fishing-line guide posture.

The cylindrical part 30 of the rotor 3 contains an anti-reverse mechanism 50. The anti-reverse mechanism 50 is configured to prevent/allow reverse rotation of the rotor 3. The anti-reverse mechanism 50 includes a one-way clutch 51 and a switch lever 52. The one-way clutch 51 is a roller clutch with a free-wheeling inner ring. The switch lever 52 is configured to switch the one-way clutch 51 between an activation state (or referred to as a reverse prevention state) and a deactivation state (or referred to as a reverse allowance state).

Spool Structure

Figure 2:
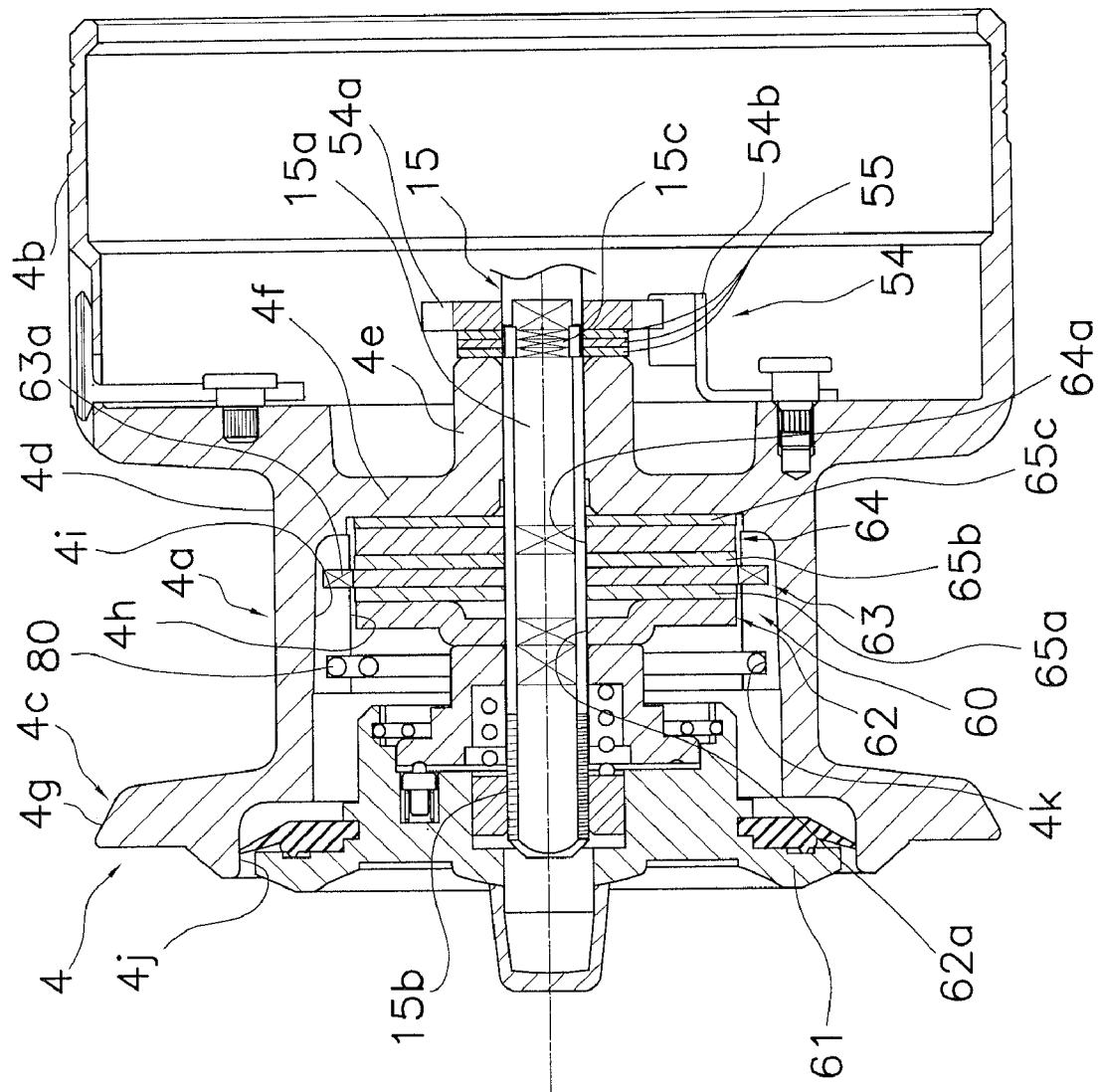
FIG. 2 is an enlarged cross-sectional view of a spool of the spinning reel.

As illustrated in FIG. 1, the spool 4 is disposed between the first rotor arm 31 and the second rotor arm 32 of the rotor 3. The spool 4 is attached to the distal end of the spool shaft 15 through the drag mechanism 60. The spool 4 is a member for winding the fishing line onto its outer periphery. The spool 4 is made of material such as metal or synthetic resin. As illustrated in FIG. 2, the spool 4 includes a bobbin trunk 4a, a skirt 4b, and a front flange 4c. The bobbin trunk 4a is used for winding the fishing line onto its outer periphery. The skirt 4b is a tubular member with large diameter, and is integrally formed with the bobbin trunk 4a. Specifically, the skirt 4b is continuously formed from the rear end of the bobbin trunk 4a. The front flange 4c is a member with a large diameter, and is formed on the front end of the bobbin trunk. The bobbin trunk 4a is a cylindrical member, and its outer peripheral surface is formed in parallel to that of the spool shaft 15. The bobbin trunk 4a includes a tubular portion 4d, a support portion 4e, and a coupler wall 4f. The tubular portion 4d is a portion onto which the fishing line is wound. The support portion 4e is a tubular portion disposed on the inner peripheral side of the tubular portion 4d. The coupler wall 4f couples the tubular portion 4d and the support portion 4e. The bobbin trunk 4a is attached to the spool shaft 15 while the support portion 4e is allowed to rotate about the spool shaft 15 but prevented from moving backward.

The front flange 4c is integrally formed with the bobbin trunk 4a. The outer peripheral surface of the front flange 4c has a forwardly extended slope 4g, i.e., a slope whose height increases in a direction away from the bobbin trunk 4a. With the slope 4g, the fishing line can be released without backlash.

A tubular drag housing recess 4h (an example of a housing part for containing a drag mechanism) is formed on the inner peripheral side of the bobbin trunk 4a, and the coupler wall 4f functions as the bottom of the drag housing recess 4h. The drag housing recess 4h includes large and small cylindrical spaces formed on the inner peripheral side of the bobbin trunk 4a. The small cylindrical space (hereinafter referred to as a small-diameter section) contains the drag mechanism 60. An interlock groove 4i is formed on the small-diameter section along a front-to-rear direction (i.e., a spool shaft direction). The interlock groove 4i serves to prevent rotation of a second drag washer 63 to be described. Further, a sealing contact 4j (an example of the inner peripheral surface of the spool) is formed on the inner peripheral side of the front flange 4c for disposing the drag knob 61 therein. The sealing contact 4j has diameter greater than that of the large-diameter section of the drag housing recess 4h. An annular spring interlock groove 4k is formed on the front part of the inner peripheral surface of the small-diameter section of the drag housing recess 4h. A retainer spring 80 is interlocked with the spring interlock groove 4k for retaining the drag mechanism 60.

Drag Mechanism Structure

As illustrated in FIG. 2, the drag mechanism 60 is contained in the drag housing recess 4h. The drag mechanism 60 is configured to apply drag force on the spool 4 by regulating rotation of the spool 4 in the fishing line release direction. In the drag mechanism 60, drag force is regulated by the drag knob 61. The drag mechanism 60 includes a first drag washer 62, the second drag washer 63, and a third drag washer 64. The drag washers 62-64 are metal washers to be pressed towards the spool 4 by the drag knob 61. Further, the drag mechanism 60 includes a drag sound mechanism 54. The drag sound mechanism 54 is configured to produce sound in the application of drag force.

The first drag washer 62 and the third drag washer 64 are coupled to the spool shaft 15 in a non-rotatable state. However, they are coupled to the spool 4 in a rotatable state. On the other hand, the second drag washer 63 is coupled to the spool shaft 15 in a rotatable state. The second drag washer 63 is coupled to the spool 4 while being unitarily rotatable with it.

The first drag washer 62 is directly pressed towards the drag knob 61. The first drag washer 62 includes an fitting hole 62a in its center part. A noncircular portion 15a, formed on the distal end of the spool shaft 15, is fitted into the fitting hole 62a in a non-rotatable state. Further, a drag disc 65a is disposed between the first drag washer 62 and the second drag washer 63. The drag disc 65a is made of material such as felt. For example, the cross-sectional outline of the noncircular portion 15a is a four-sided shape composed of a pair of parallel line segments and a pair of circular arc segments connecting the line segments.

The second drag washer 63 is a tab washer. Specifically, the second drag washer 63 includes a pair of tabs 63a on its outer periphery. The tabs 63a are interlocked with the interlock groove 4i. Further, a drag disc 65b is disposed between the second drag washer 63 and the third drag washer 64. The drag disc 65b is made of material such as felt.

The third drag washer 64 is a member for pressing the spool 4. The third drag washer 64 includes a fitting hole 64a in its center part. The noncircular portion 15a of the spool shaft 15 is fitted in the fitting hole 64a in a non-rotatable state. Further, a drag disc 65c is disposed between the third drag washer 64 and the coupler wall 4f of the spool 4. The drag disc 65c is made material such as felt.

The first drag washer 62, the second drag washer 63, and the third drag washer 64 are retained by the retainer spring 80.

The drag sound mechanism 54 includes a sound producing member 54a and a hit pawl 54b. The sound producing member 54a is a gear-shaped member attached to the rear end of the noncircular portion 15a of the spool shaft 15 in a non-rotatable state. The hit pawl 54b is attached to the rear part of the bobbin trunk 4a of the spool 4 in a pivotable state. The sound producing member 54a, which is attached to the rear end of the noncircular portion 15a, prevents backward movement of the spool shaft 15. Accordingly, backward movement of the spool 4 is also prevented. Further, three adjuster washers 55 are attached between the sound producing member 54a and the rear end of the support portion 4e of the spool 4. The adjuster washers 55 are made of material such as synthetic resin. The adjuster washers 55 adjust a front-to-rear position of the spool 4. The adjuster washers 55 are interlocked with an interlock portion 15c of the spool shaft 15 in a non-rotatable state. The interlock portion 15c has a diameter that is less than that of the other part of the spool shaft 15. With this structure, the sound producing member 54a is left undetached from the spool shaft 15 even when the spool 4 is detached from the spool shaft 15.

Drag Knob Structure

Figure 3:
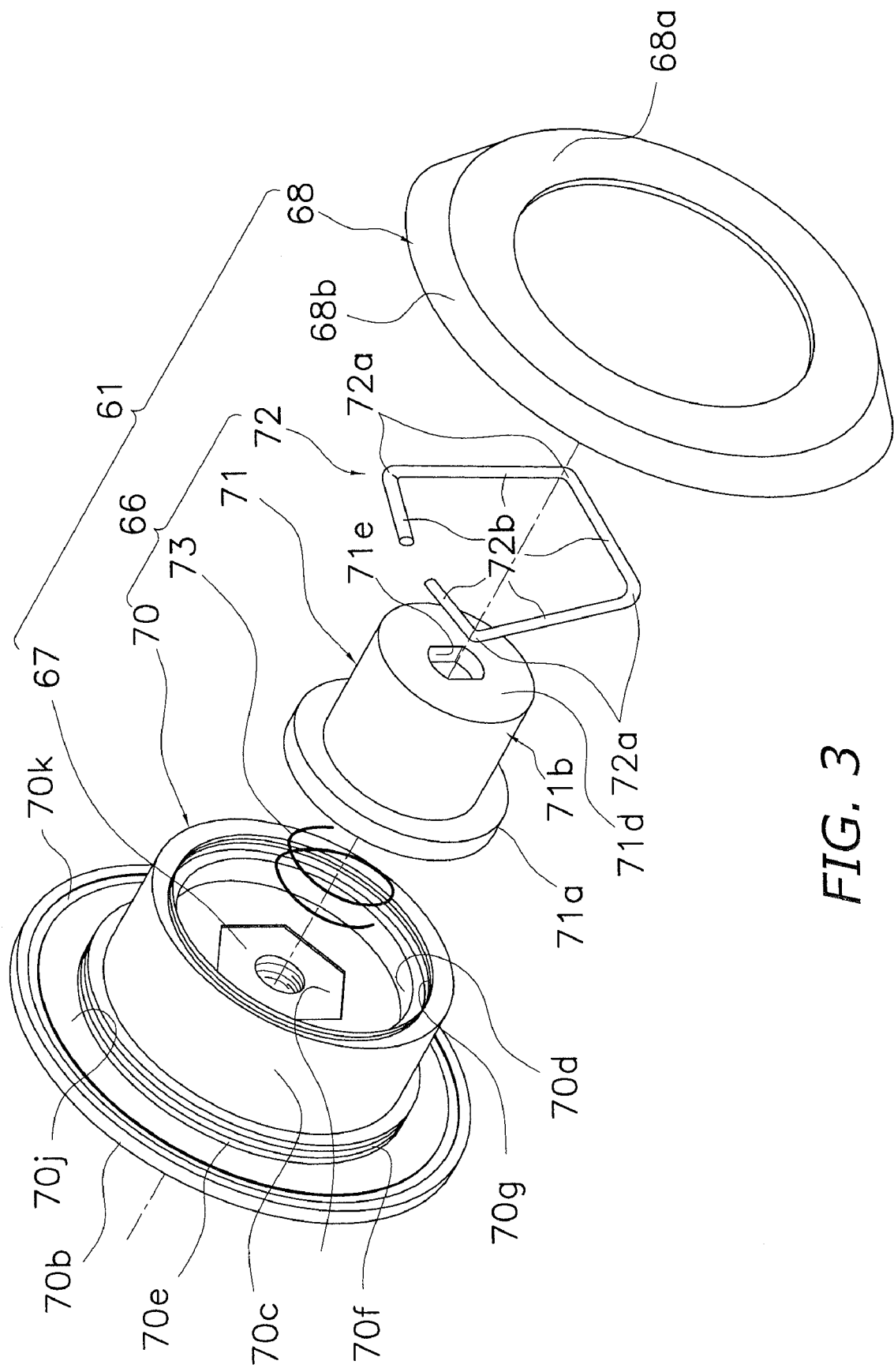
FIG. 3 is an exploded perspective view of a drag knob of the spool.
Figure 4:
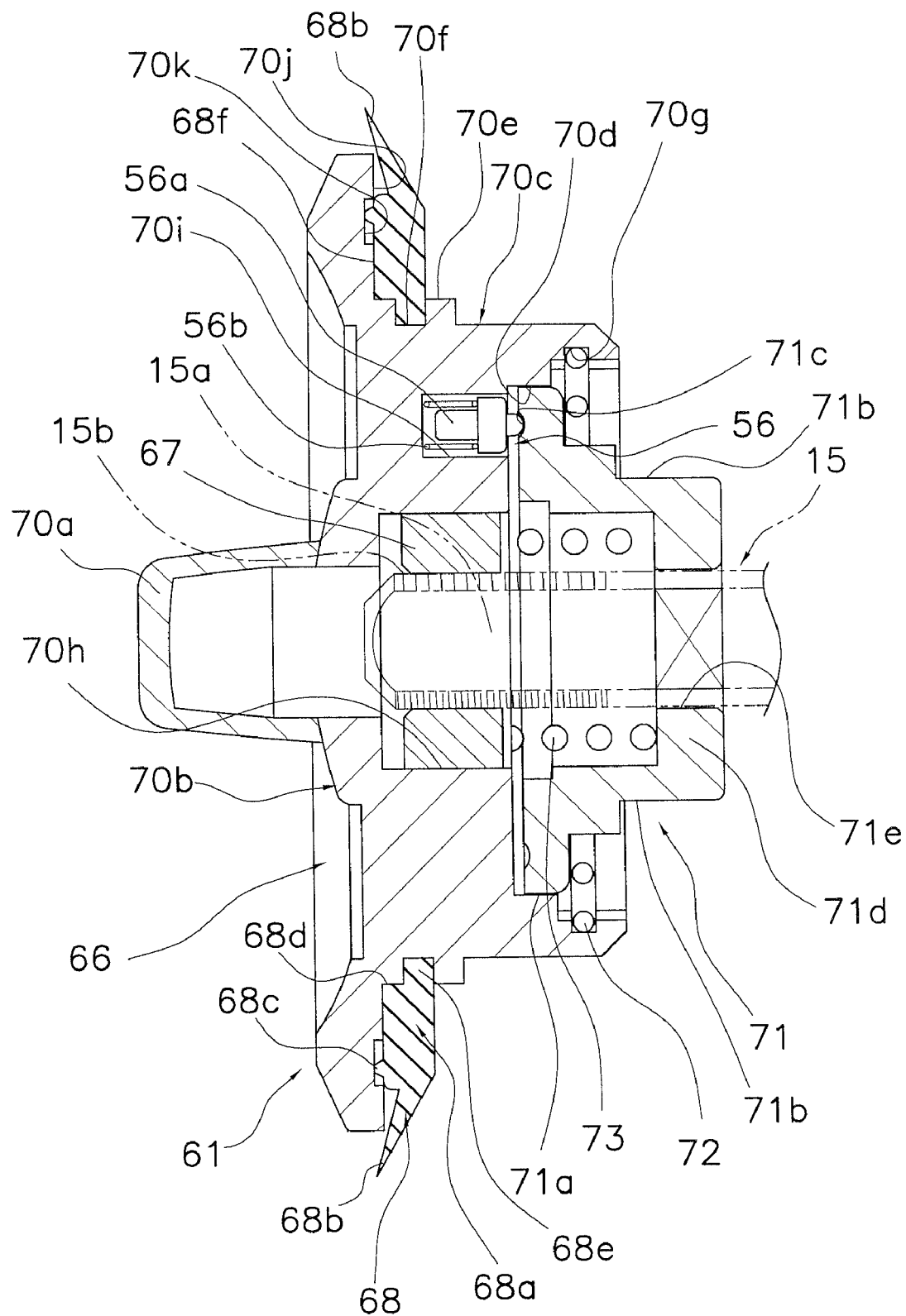
FIG. 4 is a cross-sectional view of the drag knob.

As illustrated in FIGS. 2, 3, and 4, the drag knob 61 is used for regulating the drag force of the drag mechanism 60 contained in the drag housing recess 4h. Specifically, the drag knob 61 regulates drag force while being screwed onto a male threaded portion 15b formed on the tip of the spool shaft 15 to which the spool 4 is attached. The drag knob 61 includes a knob member 66, a nut member 67, and a sealing member 68. The knob member 66 presses the first drag washer 62 of the drag mechanism 60. The nut member 67 is disposed in the knob member 66 while being unitarily rotatable with it. The nut member 67 is simultaneously screwed onto the male threaded portion 15b. The sealing member 68 is attached to the knob member 66. Further, the drag knob 61 includes a knob sound producing mechanism 56. The knob sound producing mechanism 56 is configured to produce sound when the drag knob 61 is rotated.

The knob member 66 includes a knob body 70, a press member 71, a retainer member 72, and a coil spring 73. The knob body 70 is rotatable with respect to the spool shaft 15. The press member 71 is non-rotatable with respect to the spool shaft 15. The retainer member 72 prevents the press member 71 from being detached from the knob body 70. The coil spring 73 (an example of an urging member) is disposed between the nut member 67 and the press member 71. The coil spring 73 urges the press member 71 in a direction away from the nut member 67.

The knob body 70 includes a circular rimmed portion 70b. The circular rimmed portion 70b is an example of a circular disk portion having a hole or hollow portion, or a brimmed, or ring portion that protrudes farther in the radial direction than the other portions of the knob body 70. In addition, the knob body 70 includes a knob portion 70a that protrudes from the front side of the rimmed portion 70b. The knob portion 70a is handled for manually regulating drag force. The knob body 70 further includes an outer periphery 70c and a member housing recess 70d. The outer periphery 70c is a cylindrical portion with small diameter. The outer periphery 70c is formed on the same side as a back side 70j of the rimmed portion 70b opposite the side on which the knob portion 70a is formed. The member housing recess 70d is formed in the interior of the knob body 70. The housing recess 70d has a rear end surface opened to the outside and extends to a step portion on the front side of the housing recess 70d. The rear end surface and the step portion are connected by at least one wall portion that is configured to extend parallel of substantially parallel to the spool shaft 15.

The knob portion 70a forwardly protrudes along a diameter part of the rimmed portion 70b (i.e., the center part of the rimmed portion 70b). The knob portion 70a is formed in a roughly semicircular shape in a side view. The rimmed portion 70b is a ring or disk member and its thickness is reduced towards its radial outside. The outer periphery of the rimmed portion 70b is disposed on the inner peripheral side of the sealing contact 4j of the spool 4 (see FIG. 2). The back side 70j is formed in a flat shape on the outer peripheral side of the rimmed portion 70b. The back side 70j has an annularly recessed sealing contact 70k with an open side on its backside and a closed side opposite the back side.

The outer periphery 70c has a large diameter portion 70e formed on an outer peripheral portion of the knob body 70. The large diameter portion extends further outward in a radial direction than the rest of the outer periphery 70c. The large diameter portion 70e is formed in an area axially bounded by a small diameter portion of the outer periphery 70c and the back side 70j of the rimmed portion 70b. The large diameter portion 70e has a first annular groove 70f formed in its outer peripheral surface that extends radially inwardly from the outer surface of the large diameter portion 70e. The sealing member 68 is attached to the first annular groove 70f. Further, the member housing recess 70d has a second annular groove 70g on the inner peripheral surface of its rear end. The retainer member 72 is attached to the second annular groove 70g.

The member housing recess 70d has a bottom portion 70h formed in its step portion. The bottom portion 70h has an open portion on a back side thereof and second portion that is at least partially closed opposite the open portion. The open and second portions are connected by wall portions that are configured to extend parallel or substantially parallel to the spool shaft 15. The inner outline of the bottom portion 70h is formed in a noncircular shape (e.g., hexagon). On the other hand, the outline of the opened part of the member housing recess 70d is formed in a circular shape. The nut member 67 is attached to the bottom portion 70h of the member housing recess 70d in a non-rotatable state. The outline of the nut member 67 is herein formed in a hexagonal shape, for instance. A ring-shaped flange portion 71a of the press member 71 is attached to the opened part of the member housing recess 70d. Further, an attachment hole 70i is formed in the step portion radially between the wall portion of the bottom portion 70h and the member housing recess 70d. The attachment hole 70i extends parallel to or substantially parallel to the bottom portion 70h, and has a open portion on its back side and a closed portion on its front side, and at least one wall portion joining the open and closed portions. A hit pin 56a of the knob sound producing mechanism 56 is attached in the attachment hole 70i while being movable back and forth. A spring member 56b is also attached in the attachment hole 70i. The spring member 56b urges the hit pin 56a towards plural sound producing recesses 71c (to be described below) formed on the press member 71. The hit pin 56a of the knob sound producing mechanism 56 is configured to rotate relative to the press member 71 when the knob portion 70a is rotated. The hit pin 56a thereby repeatedly makes contact with the sound producing recesses 71c, and sound is produced.

The press member 71 is partially contained in the member housing recess 70d of the knob body 70. The press member 71 is disposed axially between the knob body 70 and the first drag washer 62. The press member 71 presses the front side of the first drag washer 62 in response to an urging force of the coil spring 73. The press member 71 includes the ring-shaped flange portion 71a and a cylindrical portion 71b. The cylindrical portion 71b has a bottom portion 71d on its back side. The diameter of the bottom portion 71d is less than that of the flange portion 71a. The press member 71 is attached to the spool shaft 15. The press member 71 is prevented from rotating about the spool shaft 15 but is allowed to move in the axial direction of the spool shaft 15. The front end peripheral surface of the flange portion 71a is opposed to the bottom surface of the member housing recess 70d of the knob body 70. The rear surface of the bottom portion 71d of the cylindrical portion 71b abuts the first drag washer 62.

The flange portion 71a includes the sound producing recesses 71c. Specifically, the sound producing recesses 71c are formed on the front surface of the flange portion 71a. The sound producing recesses 71c are arranged at predetermined intervals in the circumferential direction of the flange portion 71a. The hit pin 56a of the knob sound producing mechanism 56, which is configured to produce sound when the drag knob 61 is rotated, can make contact with the sound producing recesses 71c. Further, the bottom portion 71d includes an interlock hole 71e in its center part. The interlock hole 71e is formed in an elongated groove shape. The noncircular portion 15a that is formed on the distal end of the spool shaft 15 is interlocked with the interlock hole 71e in a non-rotatable state.

The retainer member 72 is a spring member formed by bending a wire rod in a polygonal shape (e.g., rectangular). The retainer member 72 includes plural corners 72a and plural liner (or curved) couplers 72b. The liner couplers 72b basically couple the corners 72a, but one of the couplers 72b is cut in the middle. The corners 72a are interlocked with the second annular groove 70g, whereas the couplers 72b hold the rear surface of the flange portion 71a of the press member 71. Accordingly, the press member 71 is prevented from being detached from the knob body 70.

The coil spring 73 is disposed between the nut member 67 and the press member 71 in a compressed state. The front end of the coil spring 73 makes contact with the rear surface of the nut member 67, whereas the rear end of the coil spring 73 makes contact with the front surface of the bottom portion 71d of the press member 71. When the press member 71 makes contact with the first drag washer 62, the press member 71 presses the front surface of the first drag washer 62 in response to urging force of the coil spring 73.

The sealing member 68 is an annular member made of elastic resin such as synthetic rubber. The sealing member 68 includes an attachment portion 68a and a first sealing portion 68b. The attachment portion 68a is attached to the first annular groove 70f of the large diameter portion 70e of the knob body 70. The first sealing portion 68b extends from the attachment portion 68a towards the sealing contact 4j in a radially outwardly and axially forward or upwardly forward direction. The first sealing portion 68b has an outer diameter that is larger than that of the rimmed portion 70b. Further, the sealing member 68 includes a second sealing portion 68c and a third sealing portion 68d. The second sealing portion 68c makes contact with the sealing contact 70k. The third sealing portion 68d makes contact with the outer periphery 70c of the knob body 70.

The attachment portion 68a is a disc portion having an annular protrusion 68e. The annular protrusion 68e protrudes from a part of the inner peripheral surface of the attachment portion 68a in a radial inward direction of the sealing member 68. The annular protrusion 68e is axially smaller than the attachment portion 68a. The annular protrusion 68e is interlocked with the first annular groove 70f. On the other hand, the other part (i.e., the part without protrusion 68e) of the inner peripheral surface of the attachment portion 68a forms the third sealing portion 68d. The third sealing portion 68d makes contact with the large diameter portion 70e, more specifically makes contact with a portion of the large diameter portion 70e that is axially interposed by the first annular groove 70f and an inner peripheral portion of the back side 70j. The attachment portion 68a further includes a front surface 68f. The front surface 68f is disposed along the flat back side 70j. In the present exemplary embodiment, the front surface 68f makes contact with the back side 70j of the rimmed portion 70b.

Figure 5:
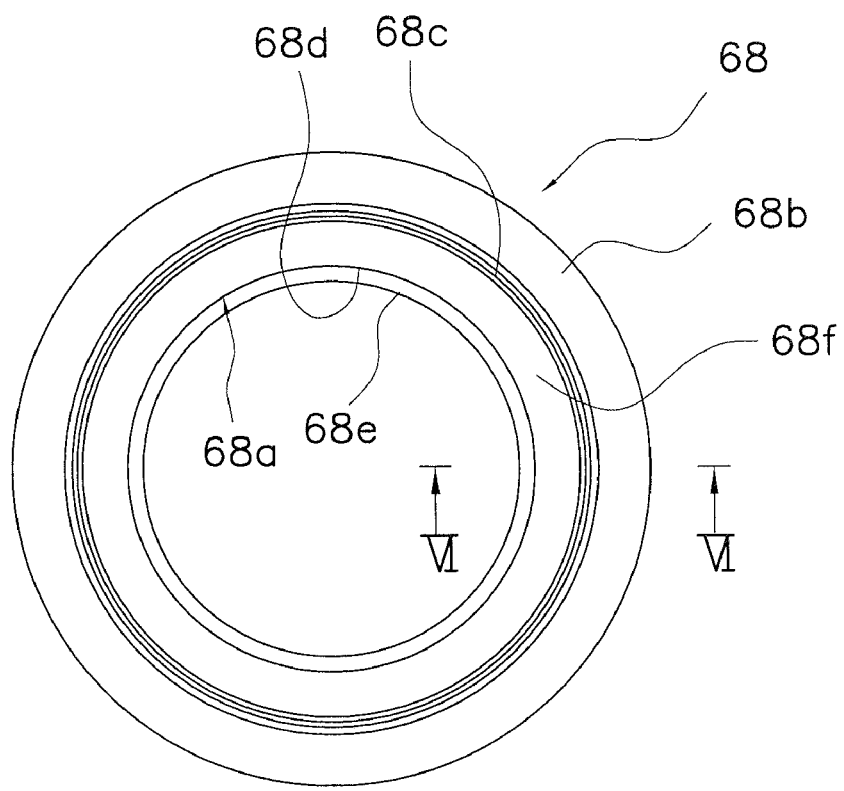
FIG. 5 is a front view of a sealing member of the drag knob.
Figure 6:
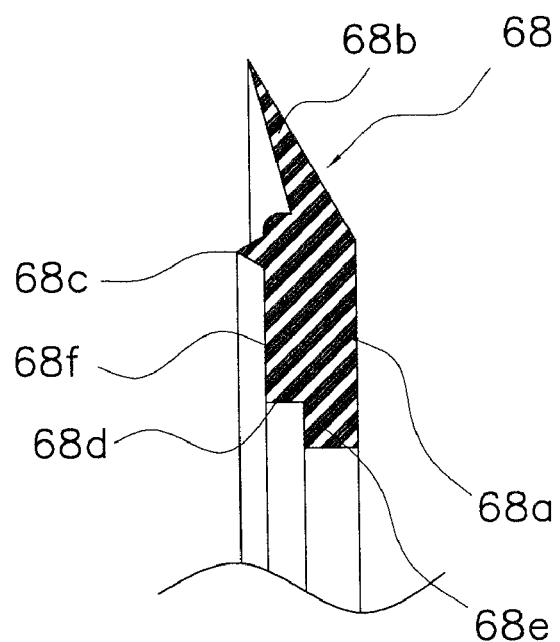
FIG. 6 is a partial cross-sectional view of the sealing member illustrated in FIG. 5 sectioned along Line VI-VI.

As illustrated in FIGS. 2, 5, and 6, the first sealing portion 68b is a tapered lip that extends in an upwardly forward direction. The edge of the first sealing portion 68b is slightly bent and makes contact with the sealing contact 4j. The first sealing portion 68b seals a clearance between the spool 4 and the drag knob 61. The second sealing portion 68c is formed on the radial inner side of the first sealing portion 68b. The second sealing portion 68c can be formed on a radially outer portion of the first sealing portion 68b to fit into the sealing contact 70k. More specifically, the second sealing portion 68c protrudes forward in an inverted-V shape from the front surface 68f of the sealing member 68. The second sealing portion 68c makes contact with the sealing contact 70k.

Operation and Action of Reel

Prior to fishing, drag force is regulated in consideration of the size and sort of fish. Drag force can be regulated by rotating the knob portion 70a. When the knob portion 70a is rotated in the clockwise direction, the nut member 67 screwed onto the spool shaft 15 moves backward and the press member 71 is accordingly pressed towards the first drag washer 62 through the coil spring 73. Here, backward movement of the third drag washer 64 is prevented by the bobbin trunk 4a. Therefore, the first to third drag washers 62-64 firmly make contact with each other in response to the urging force of the coil spring 73.

Next, when the bail arm 44 is inverted for reeling out the fishing line from the reel unit 2 in casting, the first bail support member 40 and the second bail support member 42 pivot. Thus, the bail arm 44 can be set in the fishing line release posture.

The fishing rod is herein cast while the fishing line can be hooked by the index finger of the angler's hand grabbing the fishing rod. Accordingly, the fishing line is released forward at a high momentum in response to the weight of a tackle. When the handle 1 is rotated in the fishing line winding direction, the rotor drive mechanism 5 rotates the rotor 3 in the same direction and a bail flip mechanism (not illustrated in the figure) returns the bail arm 44 to the fishing line winding position. The fishing line is accordingly wound onto the spool 4.

Features (A) The drag knob 61 is a knob for regulating drag force of the drag mechanism 60. The drag knob 61 includes the knob member 66, the nut member 67 and the sealing member 68. The knob member 66 includes the rimmed portion 70b and the outer periphery 70c. The rimmed portion 70b is formed in a circular shape and has the knob portion 70a that protrudes from its front surface, which is used for manually regulating drag force. The outer periphery 70c is formed in a cylindrical shape and has a small diameter. The outer periphery 70c is formed on the back side 70j of the rimmed portion 70b. The knob member 66 is configured to press the first drag washer 62 of the drag mechanism 60. The nut member 67 is disposed in the knob member 66 while being integrally rotatable with it. The nut member 67 is screwed onto the tip of the spool shaft 15. The sealing member 68 is attached to the outer periphery 70c. The sealing member 68 includes the first sealing portion 68b and the second sealing portion 68c. The first sealing portion 68b makes contact with the sealing contact 4j (i.e., the inner peripheral surface of the spool 4). The second sealing portion 68c makes contact with the radial outer part of the back side 70j of the rimmed portion 70b, specifically with the sealing contact 70k.

When the drag knob 61 is screwed onto the spool shaft 15, the first sealing portion 68b of the sealing member 68 makes contact with the sealing contact 4j (i.e., the inner peripheral surface of the spool 4). The structure can block liquid from entering the drag housing recess 4h formed in the spool 4. Further, the second sealing portion 68c makes contact with the radial outward part of the back side 70j of the rimmed portion 70b. The structure can reduce the amount of liquid to be caught in the space between the sealing member 68 and the rimmed portion 70b as much as possible. Therefore, liquid does not easily flow into the drag housing recess 4h even when the drag knob 61 is detached from the spool shaft 15. The sealing member 68 is herein structured and configured as follows. When the sealing member 68 is attached to the outer periphery 79c of the knob member 66, the first sealing portion 68b makes contact with the sealing contact 4j of the spool 4 whereas the second sealing portion 68c makes contact with the radial outer part of the back side 70j of the rimmed portion 70b. The structure reduces the space between the sealing member 68 and the rimmed portion 70b. Accordingly, it is possible to reduce the amount of liquid to be caught in the space between the sealing member 68 and the rimmed portion 70b as much as possible. Consequently, liquid is not easily caught in the space between the sealing member 68 and the rimmed portion 70b while liquid is blocked from entering the drag housing recess 4h.

(B) The first sealing portion 68b has an outer diameter greater than that of the rimmed portion 70b. Here, space is produced between the first sealing portion 68b and the second sealing portion 68c that makes contact with the radial outer part of the back side of the rimmed portion 70b. However, almost all of the space between the sealing portions 68b and the second sealing portions 68c is opened to the outside because of the foregoing configuration. Therefore, it is possible to reduce the amount of liquid to be caught in the space as much as possible.

(C) The sealing member 68 further includes the third sealing portion 68d that makes contact with the large diameter portion 70e of the outer periphery 70c. In this case, the third sealing portion 68d is disposed for making contact with the outer periphery 70c of the knob member 66. Therefore, liquid does not easily enter the drag housing recess 4h from the inner peripheral side of the sealing member 68, even when the liquid enters the back side 70j of the rimmed portion 70b without being blocked by the second sealing portion 68c.

(D) The back side 70j of the rimmed portion 70b is a flat surface. Further, the attachment portion 68a of the sealing member 68 is disposed along the back side 70j while being formed on the radial inner side of the second sealing portion 68c. In this case, the structure can eliminate almost all of the space between the back side 70j and the front surface 68f of the attachment portion 68a. Therefore, it is possible to reduce the amount of liquid that enters the back side 70j of the rimmed portion 70b without being blocked by the second sealing portion 68c. Further, the liquid cannot easily enter the drag housing recess 4h from the inner peripheral side of the sealing member 68.

(E) The knob member 66 includes the knob body 70, the press member 71, the retainer member 72, and the coil spring 73. The knob body 70 includes the rimmed portion 70b and the outer periphery 70c. The knob body 70 further includes the member housing recess 70d in its inside. The member housing recess 70d has a rear end surface opened to the outside. The press member 71 is a cylindrical member for pressing the first drag washer 62. The press member 71 is partially contained in the member housing recess 70d. The press member 71 is coupled to the spool shaft 15 while being prevented from rotating but allowed to move axially thereto. The retainer member 72 holds the press member 71 for preventing it from being detached from the member housing recess 70d. The nut member 67 is disposed in the member housing recess 70d while being prevented from rotating but allowed to move back and forth. The coil spring 73 is disposed between the nut member 67 and the press member 71.

In the drag knob 61, the knob member 66 is composed of the knob body 70, the press member 71, the retainer member 72 and the coil spring 73. Here, the knob body 70 is configured to rotate the nut member 67 by rotating with respect to the spool shaft 15, and the press member 71 is prevented from rotating with respect to the spool shaft 15. Further, the press member 71, which makes contact with the first drag washer 62, is pressed by the nut member 67 through the coil spring 73. Therefore, drag force can be minutely regulated by means of the coil spring 73. Further, the press member 71 and the first drag washer 62 are prevented from relatively rotating by the structure in which the first drag washer 62, which makes contact with the press member 71, is prevented from rotating with respect to the spool shaft 15. Accordingly, the press member 71 can smoothly press the first drag washer 62.

(F) The knob member 66 includes the first annular groove 70f formed on the outer periphery 70c in the vicinity of the back side 70j of the rimmed portion 70b. Further, the sealing member 68 is an elastic member to be attached to the first annular groove 70f. In this case, the sealing member 68 is made of an elastic material. Therefore, the sealing member 68 can be attached to the first annular groove 70f without using a retainer member or the like. Further, the first annular groove 70f is formed in the vicinity of the rimmed portion 70b. Therefore, the sealing member 68 can be disposed in the vicinity of the rimmed portion 70b and the back side 70j of the rimmed portion 70b can be reliably sealed.

Other Exemplary Embodiments

Other exemplary embodiments will now be explained. In view of the similarity between the first and other embodiments, the parts of the other embodiments that are identical to the parts of the first embodiment will be given the same reference numerals as the parts of the first embodiment. Moreover, the descriptions of the parts of the other embodiments that are identical to the parts of the first embodiment may be omitted for the sake of brevity.

The aforementioned exemplary embodiment is just an example of the present invention. Therefore, it should be understood that the present invention is not limited to the exemplary embodiment. It should be noted that any changes can be made without departing from the scope of the present invention.

(a) In the foregoing exemplary embodiment, the exemplified spinning reel is provided with only the front drag mechanism of many types of drag mechanisms. However, the present invention can be applied to any suitable spinning reels provided with a drag knob, such as the spinning reel provided with both the front drag mechanism and the lever drag mechanism, a spinning reel provided with both the front drag mechanism and the rear drag mechanism, etc.

(b) In the foregoing exemplary embodiment, the knob member 66 is composed of two components (i.e., the knob body 70 and the press member 71). However, the knob member 66 may be formed as a single component.

(c) In the foregoing exemplary embodiment, the sealing member 68 is provided with the third sealing portion 68d. However, the sealing member 68 is not necessarily provided with the third sealing portion 68d.

(d) In the foregoing exemplary embodiment, the exemplified spool 4 has a structure in which the front flange 4c is unitarily formed with the bobbin trunk 4a. However, the present invention can be applied to a spool with a structure in which the front flange and the bobbin trunk are provided as separate discrete components. In this case, the first sealing portion can make contact with, for instance, the inner peripheral surface of a spool ring that fixes the front flange to the bobbin trunk, as an example of the inner peripheral surface of the spool.

(e) The knob portion protrudes from a front surface of the rimmed portion in the aforementioned embodiment. However, the rimmed portion may be formed with a plurality of recess portions formed in the front surface such that the recess portions are configured to be pinched or gripped by a user to regulate drag force manually.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a reel equipped with the present invention. Accordingly, these terms, as utilized to describe the present invention should be interpreted relative to a reel equipped with the present invention as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning reel drag knob screwed onto a distal end of a spool shaft where a spool configured to move back and forth in a spinning reel is attached, the spinning reel drag knob being configured to regulate drag force of a drag mechanism contained in the spool, the spinning reel drag knob comprising:
    a knob member pressing a drag washer of the drag mechanism, the knob member including
        a circular rimmed portion having a knob portion formed on a front surface of the rimmed portion, the knob portion serving to regulate the drag force, and
        a cylindrical outer periphery having a diameter smaller than a diameter of the rimmed portion, the outer periphery being formed on a back side of the rimmed portion opposite the front surface;
    a nut member being disposed in the knob member and being unitarily rotatable with the knob member, the nut member being screwed onto a distal end of the spool shaft; and
    a sealing member including
        an attachment portion being attached to the outer periphery,
        a first sealing portion making contact with an inner peripheral surface of the spool, and
        a second sealing portion making contact with a radial outward part of the back side of the rimmed portion, the second sealing portion being a protrusion which protrudes to the front side.

2. The spinning reel drag knob according to claim 1, wherein the first sealing portion has an outer diameter greater than that of the rimmed portion.

3. The spinning reel drag knob according to claim 1, wherein the sealing member further includes a third sealing portion that makes contact with the outer periphery.

4. The spinning reel drag knob according to claim 3, wherein the back side of the rimmed portion is formed in a flat shape, and the attachment portion of the sealing member is disposed along the back side and contacts the back side on a radial inner side of the second sealing portion.

5. The spinning reel drag knob according to claim 1, wherein the knob member includes
- a knob body having the rimmed portion, the outer periphery, and a housing recess being formed in an interior of the knob body, the housing recess having a rear end surface opened to the outside,
- a cylindrical press member configured to press the drag washer, the press member being partially contained in the housing recess, the press member being non-rotatably and axially movably coupled to the spool shaft,
- a retainer member holding the press member partially in the housing recess, and
- an urging member being disposed between the nut member and the press member, and
- the nut member being disposed in the housing recess and being movable back and forth and unitarily being rotatable with the housing recess.

6. The spinning reel drag knob according to claim 1, wherein the knob member includes an annular groove formed on the outer periphery, the annular groove being arranged on a front portion of the outer periphery, and the sealing member is an elastic member attached to the annular groove.

* * * * *